United States Patent Office 2,697,653
Patented Dec. 21, 1954

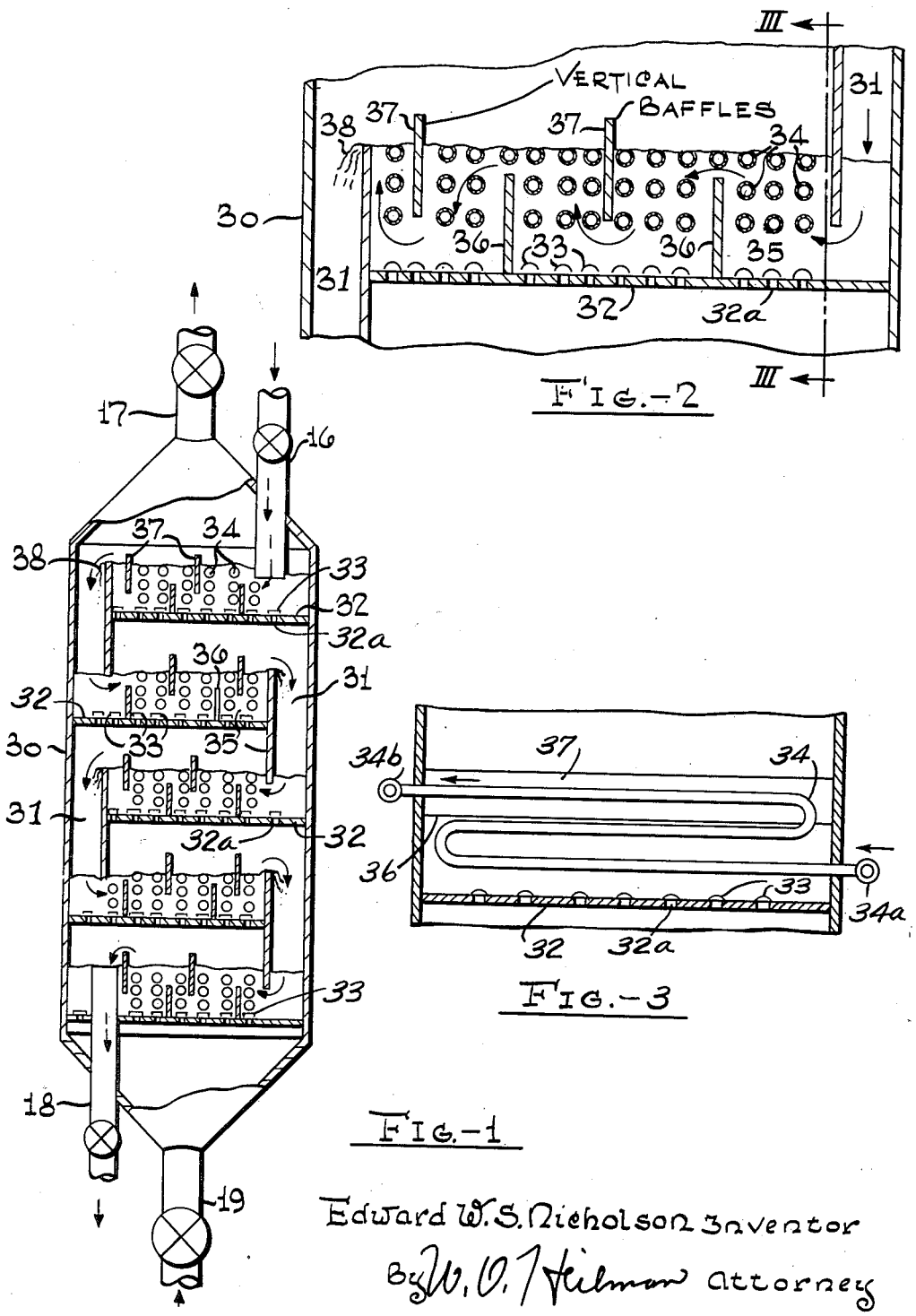

2,697,653

CONTACTING TOWER FOR VAPORS AND FINELY DIVIDED SOLIDS, INCLUDING HEAT EXCHANGE MEANS THEREFOR

Edward W. S. Nicholson, Baton Rouge, La., assignor to Standard Oil Development Company, a corporation of Delaware Application November 28, 1951, Serial No. 258,721

1 Claim. (Cl. 23—288)

The present invention is concerned with an improved method and apparatus for contacting vapors with fluidized, finely divided solid particles. The invention is more particularly concerned with a method and apparatus for contacting fluidized solid particles and vapors in a series of superimposed contact chambers or zones in a contacting vessel, wherein the fluidized solid particles are passed downwardly in countercurrent relationship to the ascending vapors or gases and wherein it is desired to transfer heat into or out of the bed or beds of fluidized solids.

In accordance with the present invention, vapors or gases are passed through a reaction zone or vessel in a direction countercurrent to the flow of finely divided fluidized contacting materials. The vapors are passed upwardly through the reaction zone and the finely divided solid particles are passed downwardly under conditions wherein the velocity of upflowing vapor or gas is so adjusted that the solid particles are fluidized and simulate a liquid. The invention is specifically directed to the use of heat transfer tubes positioned in the bed of fluidized solids in the respective contact chambers wherein excellent heat transfer between the fluidized solids and the tubes is materially increased by the use of vertical baffles so positioned to cause the fluidized solids to flow upwardly and downwardly across the tube bundles as the fluidized solids pass transversely across the zone.

It is well known in the art to conduct various reactions employing fluidized solid particles wherein gases and vapors are contacted with the same. In these reactions, the solid particles are maintained in a fluidized state by the velocity of upflowing gases which for example is normally in the range of from about 0.5 to 3 ft. per second. The size of the catalyst particles is usually below about 200 microns. Usually, at least 50% of the catalyst has a micron size in the range from about 20–80. In fluidized solid operations of this character, it is also known to use bubble cap trays wherein the upflowing gases move from one zone to another through bubble caps or their equivalent into a dense bed of fluidized solids disposed immediately above the respective trays. These solids flow across the tray and across a weir into a downcomer and pass into the zone below. The height of the dense bed or phase above the respective tray is determined by the weir height. It is also known in the art to position tubes in the dense bed of fluidized solids positioned above the bubble cap tray. Fluids are passed through the tubes for the purpose of either imparting heat to the bed of dense fluidized solids or for the purpose of cooling the bed of fluidized solids.

In accordance with the present invention, it has been found that it is desirable to position the tube bundles somewhat above the bubble cap trays in order to allow an open space between the bottom row of tubes and the plate. With such an arrangement, however, the bulk of the heat transferred occurs as a result of a part of the solids in the main stream circulating up through the tube bundle and back down into the main stream of crossflow solids. If the amount of such material cycling from the main stream up through the tubes and back is at a rate equal to or greater than the crossflow rate of the main body of solids, satisfactory heat transfer can be obtained. However, frequently this rate of cycling material is less than the rate of crossflow. In such cases, the amount of heat that can be transferred as sensible heat from this smaller quantity of cycling solids is small compared to the total amount of heat that needs to be transferred, and the overall result is the same as if poorer heat transfer coefficients were obtainable from the embedded heat transfer equipment on the fluidized solids plates. Therefore, in accordance with the present invention, it has been discovered that a more efficient transfer of heat is secured provided the fluidized solids are caused to flow upwardly through the tube bundles and then downwardly through the tube bundles as these fluidized solids pass transversely across the bubble cap tray.

The invention and its objects may be more fully understood from the following description when read in conjunction with the accompanying drawings. Figure 1 illustrates a typical fluidized solids contacting vessel in vertical section while Figure 2 illustrates in enlarged detail the present invention as applied to a single stage as shown in Figure 1, and Figure 3 illustrates a similar view taken along the line III—III of Figure 2. Referring specifically to Figure 1, numeral 30 designates a multi-stage fluidized solids bubble tray column, contacting vessel. Vessel or contacting zone 30 is conventionally provided with a series of vertically spaced, transverse, perforated plate elements 32, forming a vertical series of superimposed, contact chambers or zones. These chambers or zones are in communication one with another by way of the passageways 32a formed by the plate perforations, and downcomers 31 disposed at alternate sides of the vessel from plate to plate. The downcomers extend from the surface of one plate downwardly into vertically spaced relation to the surface of the plate next below. As shown in Figure 1, the passageways 32a through the plate are each provided with bubble cap elements 33. In addition, each plate 32 is provided with a weir member 38, at the entrance to the downcomer 31, extending upwardly from the plate surface to a level above the lower end of the downcomer from the plate next above. The vessel is also provided with an inlet pipe 16 for fluidized solid material extending into the upper end of the vessel, and terminating in spaced relation to the uppermost plate 32, below the upper end of the weir 38 for that plate. An outlet from the vessel for gaseous materials is provided as by conduit 17. At the lower end of the vessel is an outlet 18 for finely divided solid materials, and an inlet 19 for gaseous materials to be passed through the vessel. Tubes 34 arranged as bundles are represented as positioned in the fluidized bed above the bubble cap trays.

Referring specifically to Figure 2, downflowing solids enter the illustrated stage of zone 30 by means of downcomer 31. These solids flow around the lower edge of the downcomer onto bubble cap tray 32 containing bubble caps 33. Tubes 34 are shown positioned above bubble cap tray 32. A free space 35 is provided between the lowest tubes and the top of the bubble caps. In accordance with the present invention, baffle elements 36 and 37 are provided so that as the fluidized solids pass transversely across plate 32 these solids flow upwardly and downwardly through the tube bundles and are ultimately discharged over weir 38 into the next downcomer 31 through which the fluidized solids pass to the next succeeding lower zone.

The view provided by Figure 3 is a showing of the sectional view of Figure 2 rotated 90° and provides an illustration of one way in which the tube bundles may be connected for the introduction and removal of fluids into and from such bundles. In the structure illustrated, each of the several bundles is connected to an inlet header 34a and an outlet header 34b substantially in the manner shown. It is understood, however, that the provision of such means is only one of a number of conventional piping connections which may be arranged for the purpose intended.

The invention is broadly concerned with an improved method of transferring heat into or out of a bed of fluidized solids wherein bubble cap trays are utilized. The invention contemplates the use of vertical baffle elements spaced on the bubble cap trays in a manner to direct the fluidized solids to flow upwardly and downwardly through tube bundles positioned in the dense bed of the fluidized solids above the trays. It is to be understood that suitable means are provided for introducing fluids such as liquids and gases into the tube bundles and for withdrawing fluids from these tube bundles. The tube bundles may comprise any arrangement and number of tubes or their equivalent. Furthermore, if a multi-stage contacting unit is utilized, the tubes between the respective stages may be interconnected in any manner desirable or they may be operated independently one from the other.

What is claimed is:

In an apparatus for contacting finely divided solid materials with vapors, wherein said solids are fluidized by said vapors, including a vertical contacting vessel, a series of vertically spaced bubble cap trays transversely of said vessel, a plurality of downcomers, each of which extends through a tray, having an upper end forming a weir opening from a level above one tray and a lower end opening at a level above the tray next below but below the level of the upper end of the downcomer extended therethrough, said downcomers being disposed in diametrically opposed relation from tray to tray, means for introducing fluidized finely divided solid materials onto the upper tray in said series and means for withdrawing said materials from the lowermost tray, means for introducing a vapor upwardly through said lower tray and means for removing said vapor from above said upper tray, wherein said fluidized solids flow laterally of each tray from a downcomer lower end to an opposite weir, a means for passing a heat exchange fluid into indirect heat exchange relation with fluidized finely divided solid materials on said trays, comprising a series of vertical baffles extended transversely of said vessel above each tray and perpendicular to the flow direction of said solid materials thereover, wherein the first baffle in said series extends upwardly from said tray to a level above the lower end of the downcomer opening onto said tray but below the upper end of the downcomer opening therefrom, the last member in said series extends upwardly from a level vertically spaced above said tray but below the upper end of the downcomer therefrom to a level above the upper end of said downcomer, but below the tray next above, and wherein the members of said series intermediate the first and last members are disposed alternately as are said last and first members, and wherein said members of the series are spaced one from another laterally in the direction of flow of said solid materials across said tray, a bank of heat exchange conduits disposed intermediate each of said baffles at a level above said tray, and substantially below the upper end of the downcomer therefrom, said conduits extending parallel to said baffles and perpendicular to the flow of solids across said tray, and means for passing a heat exchange fluid through said conduits.

References Cited in the file of this patent

UNITED STATES PATENTS

| Number | Name | Date |
|---|---|---|
| 22,391 | Walker | Dec. 21, 1858 |
| 1,002,578 | Gayley | Sept. 5, 1911 |
| 1,878,467 | Clarke | Sept. 20, 1932 |
| 2,059,044 | Seelig et al. | Oct. 27, 1936 |
| 2,419,245 | Arveson | Aug. 22, 1947 |
| 2,436,870 | Murphree | Mar. 2, 1948 |
| 2,493,526 | Campbell et al. | Jan. 3, 1950 |
| 2,494,337 | Hemminger | Jan. 10, 1950 |
| 2,591,343 | Eld | Apr. 1, 1952 |
| 2,639,973 | Fritz | May 26, 1953 |